(12) United States Patent
Vernondier et al.

(10) Patent No.: US 8,030,851 B2
(45) Date of Patent: Oct. 4, 2011

(54) SWITCHABLE INDUCTION LIGHT

(76) Inventors: David R. Vernondier, Co. Durham (GB); Richard J. Clark, Hants (GB)

( * ) Notice: Subject to any disclaimer, the term of this patent is extended or adjusted under 35 U.S.C. 154(b) by 681 days.

(21) Appl. No.: 12/179,040

(22) Filed: Jul. 24, 2008

(65) Prior Publication Data
US 2009/0009093 A1    Jan. 8, 2009

Related U.S. Application Data

(63) Continuation-in-part of application No. 11/881,758, filed on Jul. 27, 2007, now abandoned.

(30) Foreign Application Priority Data

Jul. 27, 2006  (GB) .................................. 0614951.2
Jan. 12, 2007  (GB) .................................. 0700670.3

(51) Int. Cl.
*H05B 37/02* (2006.01)
(52) U.S. Cl. .................. 315/149; 315/209 R; 315/150; 315/154; 315/159
(58) Field of Classification Search .............. 315/209 R, 315/177, 32, 33, 34, 70, 74, 149, 150, 153, 315/154, 151, 158, 159, 160, 171, 172, 218, 315/219, 224, 225, 226, 246, 254, 267, 276, 315/282, 287, 36
See application file for complete search history.

(56) References Cited

U.S. PATENT DOCUMENTS

| | | | |
|---|---|---|---|
| 4,761,724 A | 8/1988 | Brown et al. | 363/21 |
| 4,942,352 A * | 7/1990 | Sano | 320/134 |
| 5,416,384 A | 5/1995 | Bavaro | 315/86 |
| 5,897,194 A * | 4/1999 | Ham | 362/20 |
| 2002/0008973 A1 | 1/2002 | Boys et al. | 362/307 |

FOREIGN PATENT DOCUMENTS

| | | |
|---|---|---|
| DE | 297 05 559 U1 | 8/1998 |
| EP | 0 357 829 A1 | 9/1988 |
| EP | 0 380 788 A1 | 12/1999 |
| FR | 2 695 285 | 9/1992 |
| WO | WO 03/081745 | 10/2003 |
| WO | WO 2004/097866 | 11/2004 |

OTHER PUBLICATIONS

GB Search Report for Application No. 0614951.2, Jul. 2006.
EPO Standard Search Report related to specification of GB 0700670. 3, Jul. 2006.

* cited by examiner

*Primary Examiner* — Douglas W Owens
*Assistant Examiner* — Jianzi Chen
(74) *Attorney, Agent, or Firm* — Westman, Champlin & Kelly, P.A.

(57) ABSTRACT

A light fitting is provided with a first connector piece arranged to support a light and provide power thereto, an input connected to a power source and arranged to provide power permanently to an output comprising a primary coil, and a transmitter operable to transmit a switch signal. A light is provided comprising a sealed light housing, a light source, a back-up battery, a controller and a second connector piece having a secondary coil and a receiver. The receiver receives the switch signal and the controller controls power delivery to the light source in response to the switch signal received by the receiver thereby to turn the light on and off. The light fitting and the light are arranged to present the primary coil and the secondary coil for inductive coupling therebetween and to present the transmitter and the receiver for wireless communication therebetween.

37 Claims, 5 Drawing Sheets

SWITCHABLE INDUCTION LIGHT

TECHNICAL FIELD

This invention relates to an induction light that can be powered by a primary power supply or by a back-up battery in the event of a failure in the primary power supply.

BACKGROUND TO THE INVENTION

FR 2 695 285 describes an induction lighting system for domestic use comprising two parts: a first part, corresponding to a wall (or ceiling) fitting, connected to a primary power supply such as the electricity mains; and a second part, corresponding to a luminaire with a light bulb. In the wall fitting, the mains supply is connected to a primary coil. The luminaire has a secondary coil that, in use, is placed next to the primary coil such that power is transferred to the light bulb by induction.

As this system does not require exposed electrical connections on either the wall fitting or the luminaire, safety is improved thereby making it better suited for providing light in a kitchen or bathroom, where extra certification requirements must be met in view of humidity.

However, should the mains supply fail, the light bulb also fails to operate. WO 03/081745 provides an improved induction lighting system, which also includes inductively-powered light modules, each of which comprises both a coil for receiving power from the mains supply and a back-up battery in case the mains supply fails. When a power output from the mains supply is available, the back-up battery may be charged.

However, this document does not address a standard consideration in domestic environments, namely that light switches are provided to switch the light source on and off. With this arrangement, somebody wishing to turn the light off would turn the switch off. This would cause disconnection from the mains supply, which will disable the inductive power supply. This is potentially advantageous, as this change is effected through the light fitting and without exposed electrical connections. However, contrary to requirement, the light will remain switched on, because disconnection of the inductive power supply will enable the alternative power output from the back-up battery in the light module.

SUMMARY OF THE INVENTION

Against this background, the present invention provides a lighting apparatus comprising: a light fitting adapted to support an associated light and having a space adapted to receive the associated light; and an input arranged to receive a control signal, the control signal having at least two switching states corresponding to the associated light being turned on and off. The light fitting further comprises: an electrical output comprising a coil arranged to provide a power signal inductively to the associated light; and a transmitter arranged to send a further, switch signal wirelessly to the associated light, the switch signal being established in accordance with the state of the control signal thereby effecting turning on and off of the associated light. The power signal is non-zero irrespective of the switch signal and the light fitting is arranged to present the coil and the transmitter for cooperating with a respective coil and respective receiver in the associated light.

Although the electrical output and the transmitter provide two different functions, they may be embodied in the same component or components of the light fitting. For example, the transmitter may also comprise the coil of the electrical output. The power signal is advantageously an alternating current signal. A non-zero alternating current signal is well understood to be a signal of non-zero power or amplitude, although such a signal may have non-zero magnitude at particular points. The light fitting may present the coil and transmitter so as to be adjacent to the space that receives the associated light. This effects said cooperation.

The present invention also provides a light comprising: a light source; a coil arranged to receive an electrical power signal inductively and to provide electrical power to the light source; a back-up battery arranged to provide electrical power to the light source when the coil does not receive electrical power; a receiver operable to receive wirelessly a further, switch signal; a controller operable to control flow of power to the light source from the coil and the back-up battery responsive to the received switch signal; and a sealed light housing to house the light, the light housing being arranged to present the coil and the receiver for cooperating with a respective coil and respective transmitter in an associated light fitting.

Similarly to the light fitting, although the coil and the receiver provide two different functions, they may be embodied in the same component. For example, the receiver may also comprise the coil. The power signal and switch signal are advantageously sent simultaneously.

The light housing may comprise a connecting portion. The connecting portion may house the coil and receiver to thereby present the coil and receiver to cooperate with the coil and transmitting in the associated light fitting. This may be effected by ensuring that the coil and receiver in the light will be proximate to the corresponding parts in the associated light when the light is presented in the light fitting. Advantageously, the connecting portion may be arranged to fit into an associated light fitting.

The controller controls whether power is supplied to the light source. Optionally, the controller may also control whether that power is provided by the coil or the back-up battery. The controller need not be complex and may be a switch.

The present invention also provides a lighting system comprising a combination of the above lighting apparatus and light.

With the above arrangements, providing electrical power to the light through a lighting fitting is performed separately to providing a switch signal through said light fitting. Accordingly, throwing the switch in the lighting apparatus will cause the light to turn on and off. This is because operating the switch causes the transmitter to send the switch signal to the light through the light fitting where it is received by the receiver. The controller then responds to the signal received by the receiver to either send power to the light source or not. This is in stark contrast to conventional lighting systems where the light switch is used directly to connect or disconnect the power supply to the light.

An advantage of the present invention is that it allows a light fitting and light that do not have exposed electrical connections. To this end, the coil of the light apparatus may be positioned behind an insulator. Likewise, the coil of the light may also be positioned behind an insulator. Preferably, the insulator covers all of the external surface of the light fitting to ensure the safety of the light fitting. A corresponding arrangement may be used on the light as well, i.e. it may be formed such that all of its exterior is insulating.

The light fitting may be attached to the ceiling or wall of a building such as a home. The fitting may then receive a light in a manner akin to placing a light bulb or a fluorescent strip light in their respective conventional light fittings. The light fitting presents the coil so as to be adjacent to the space that receives the associated light, i.e. the coil will be disposed in the light fitting to be adjacent the coil of the light when the light is fitted to the light fitting. Of course, this promotes the inductive coupling between the coils.

Similarly, the light fitting presents the transmitter so as to be adjacent to the space that receives the associated light. The connecting portion of the light housing houses the receiver, such that the receiver is adjacent the transmitter, when the light is inserted into the fitting.

The transmitter/receiver combination may take one of many forms. For example, the transmitter/receiver may operate using an electromagnetic signal such as light or infra-red, a radio signal or even an electrical or magnetic field such as in a capacitor or relay. Importantly, the transmitter/receiver should communicate via a remote link rather than a physical link as this allows electrical connections in the light fitting and light to remain internal and out of harms way.

Where an optical or infra-red link is used, the transmitter may be a light source, e.g. a LED, and the receiver may be a photodiode. The insulator separating the transmitter and receiver should then allow a useable fraction of the electromagnetic radiation to pass, preferably being substantially transparent to the electromagnetic radiation. This may be done either by using a transparent material for the insulator or by providing a window in the material.

Where an electrical field link is used, the light fitting may comprise one plate of a capacitor, and the light may comprise a corresponding plate. A dielectric may be used as for the exteriors of the light fitting and light between the plates to ensure there are no exposed electrical connections.

The transmitter can alternatively be inductive. Then, the transmitter may comprise a coil. Similarly, the receiver in the light may also comprise a coil.

More preferably, the transmitter comprises the coil of the electrical output, such that this coil provides the power signal and the switch signal to the associated light. Similarly, the coil in the receiver of the light may be the same coil as arranged to receive the electrical power signal. In this way, providing power to the light and effecting turning on and off of the light can be achieved without the need for an additional link between the light fitting and the light.

In this case, the light fitting may comprise a modulator, arranged to adjust the amplitude of the power signal based upon the control signal. The receiver in the light may correspondingly comprise a demodulator, arranged to determine the switch signal based on the amplitude of the power signal. Alternatively, the light fitting may comprise a modulator, arranged to adjust the frequency of the switch signal based upon the control signal. This can be understood to be a form of frequency shift keying. Correspondingly, the receiver may comprise a frequency demodulator. Other forms of modulation, for example phase modulation, phase shift keying, quadrature amplitude modulation, may alternatively be used.

The switch signal may comprise two different signals, one corresponding to on and one corresponding to off, or it may comprise a signal only for one state. For example, with the switch on, the transmitter may send a switch signal to the light and, with the switch off, the transmitter may not send a switch signal to the light.

Of course, the present invention may be used with dimmer switches. In this case, the switch will have more than one state: there will be one state corresponding to off and a variable state corresponding to different power levels to be supplied to the light source to effect the required intensity of lighting. In this case, the switch signal may effect the required lighting, e.g. the switch signal may be an analog signal with a value that represents the required lighting intensity as set using the dimmer switch.

Preferably, the lighting apparatus further comprises an electrical input arranged to receive electrical power from a power source such as a main supply, and wherein the electrical output is arranged permanently to use the electrical power received to provide the power signal. In this way, electrical power is supplied to the light at all times, even when the switch is turned off. This is particularly useful as it allows the back-up battery to be kept in a state of constant readiness. The back-up battery may be recharged continually when electrical power is received by the light, or the charge of the battery may be monitored and recharged once it drops below a certain threshold.

The transmitter may be powered in different ways. For example, the transmitter may be powered from the power source that may be a main supply, or it may be powered from a battery. Where a battery is provided, it may be recharged by the power source.

Optionally, the switch may be a light switch provided on a wall or similar of a building such as a home. The switch may be provided on its own, or it may be one of a plurality of switches provided on a common switch fitting, each switch operating a different light. Indeed, there may be more than a single switch operating the light of the present invention, e.g. a landing light may be controlled independently by two switches, one positioned downstairs and one positioned upstairs. In a domestic environment, the switch may be powered by the ring mains generally routed around the walls of a home.

As will be appreciated, the light source may be powered from either the coil or the back-up battery when no power is received by the coil. Optionally, the back-up battery can provide electrical power to the light source even when the coil receives electrical power. Advantageously, the light may further comprise a switching device to manage whether the light source is powered from the coil or from the back-up battery. The switching device may comprise a first diode, biased to allow power to flow from the coil to the light source when the coil receives electrical power, and a second diode, biased to allow power to flow from the back-up battery to the light source when the coil does not receive electrical power.

The light may correspond to many of the conventional forms of lighting. For example, the light source may comprise an incandescent light bulb, a halogen bulb, or a fluorescent tube. The light source preferably comprises one or more LEDs. When the state of the switching signal causes the light source to be active, the light source may be continuously powered. Alternatively, the light source may be powered intermittently, for example according to a pulse width modulation scheme, thereby requiring less energy consumption, whilst providing adequate light output.

The light source is preferably placed in a housing. The back-up battery may be external to the housing, but is preferably also housed within the housing and preferably the housing is sealed to be watertight. A valve is optionally provided in the light. A hydrophobic valve is advantageously used to allow gas to exit from the light but to prevent water from entering the light.

Optionally, when an LED, or other cold-running light source is used, a ring may be arranged on the light housing, such that the light housing is sealable to an insulating material. Preferably the ring is an o-ring and is positioned adjacent to the secondary coil, such that when the light is fixed into the light fitting, a mechanical seal is created between the light and the insulator of the light fitting, advantageously so as to prevent water from entering the space between the light and the insulating material. Alternatively, the ring may be arranged on the light fitting in the space adapted to receive the associated light. This may increase the efficiency of power transfer to the light. Most preferably, the light fitting is integrally formed.

The present invention also resides in a lighting system comprising: a light comprising a sealed light housing and a light source; a light fitting with a first connector piece arranged to support the light and provide power thereto; a light switch operable to turn the light on and off. The light fitting comprises an input connected to a power source and arranged to provide power permanently to an output comprising a primary coil, and a transmitter coupled to the switch and operable to transmit a switch signal dependent upon the switch position. The light further comprises a second connector piece having a secondary coil and a receiver, the receiver being operable to receive the switch signal; a light source connectable to the secondary coil to be powered therefrom; a back-up battery connectable to the light source to provide power thereto in the event of a failure in the power supply from the secondary coil; and a controller operable to control power delivery to the light source in response to the switch signal received by the receiver thereby to turn the light on and off. The light fitting and the light are arranged to present the primary coil and the secondary coil for inductive coupling therebetween and to present the transmitter and the receiver for wireless communication therebetween.

The light fitting and the light may be arranged such that the coil and transmitter in the light fitting and the coil and receiver in the light are positioned such that the primary coil and secondary coil may cooperate and the transmitter and receiver may cooperate. The coil in the light fitting and coil in the light in the light may be arranged to be proximate with one another, when the light is fitted into the light fitting. Also, the transmitter in the light fitting and the receiver in the light may be arranged to be proximate with one another, when the light is fitted into the light fitting.

The present invention may also be found in a lighting apparatus comprising: a light fitting adapted to support an associated light and having a space adapted to receive the associated light; and an input arranged to receive a control signal, the control signal having: a first switching state corresponding to the associated light being turned on; and a second switching state corresponding to the associated light being turned off. The light fitting further comprises: an electrical output comprising a coil arranged to provide a power signal inductively to the associated light, the light fitting being arranged to present the coil for cooperating with a respective coil and respective receiver in the associated light. The power signal comprises one of: a first non-zero power signal; and a second non-zero power signal, and the electrical output is arranged to provide the first power signal when the control signal comprises the first switching state, and the second power signal when the control signal comprises the second switching state.

Correspondingly, the present invention may be found in a light comprising: a light source; a coil arranged to receive an electrical power signal inductively and to provide electrical power to the light source; a back-up battery arranged to provide electrical power to the light source when the coil does not receive electrical power; and a sealed light housing to house the light, the light housing being arranged to present the coil for cooperating with a respective coil in an associated light fitting. The power signal comprises one of: a first non-zero power signal; and a second non-zero power signal. The light further comprises a controller operable to provide power from the coil to the light source when the power signal comprises the first non-zero power signal so as to activate the light source, and to deactivate the light source when the power signal comprises the second non-zero power signal.

Preferably, the first non-zero power signal has a first amplitude and the second non-zero power signal has a second amplitude, the second amplitude being less than first amplitude. Alternatively, the first non-zero power signal comprises a component at a first frequency and the second non-zero power signal comprises a component at a second frequency. In that case, the first and second power signals may also comprise a component at a common, third frequency. Advantageously in either case, the first and second power signals both provide sufficient power to charge a battery.

BRIEF DESCRIPTION OF THE DRAWINGS

The invention may be put into practice in various ways, a number of which will now be described by way of example only and with reference to the accompanying drawings in which.

DESCRIPTION OF PREFERRED EMBODIMENTS

Figure 1:
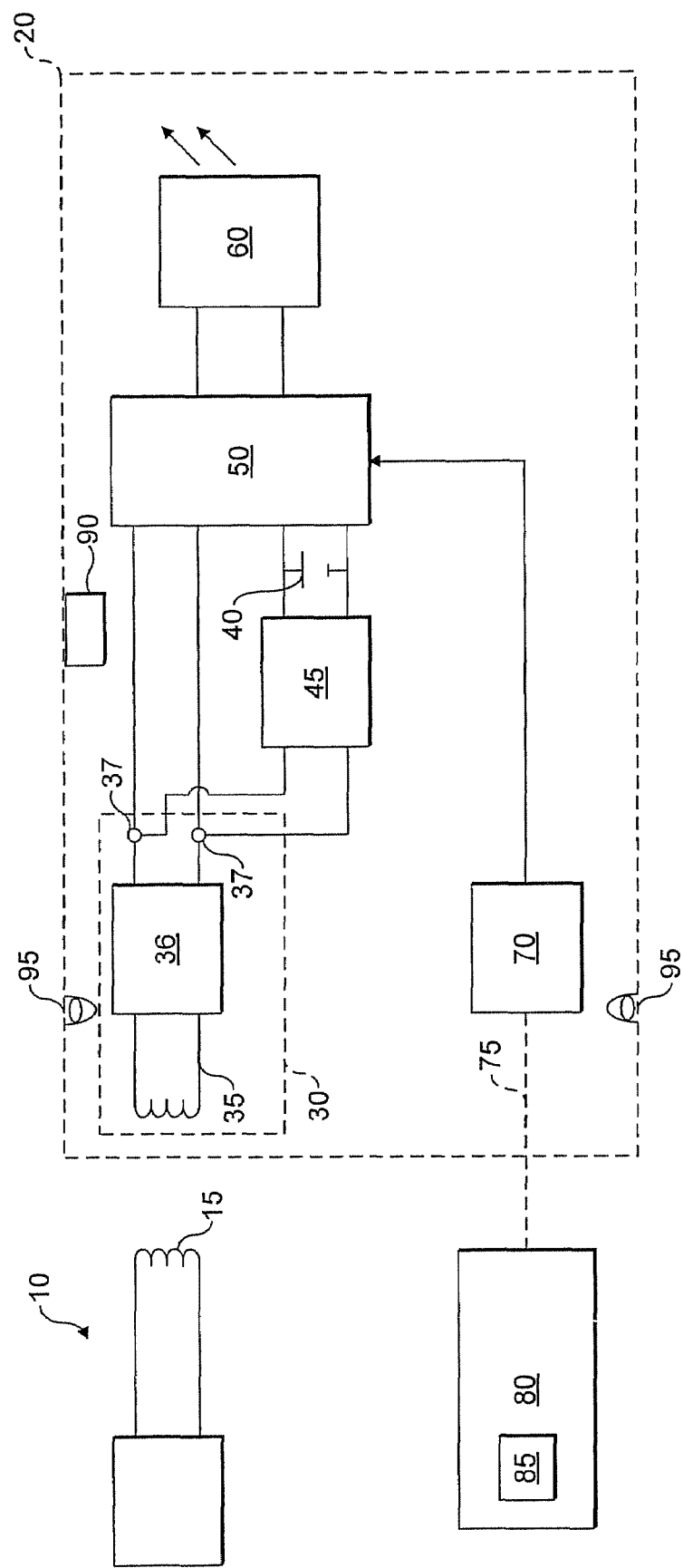
FIG. 1 shows a schematic diagram of a lighting system according to a first embodiment of the present invention.

Referring first to FIG. 1, a schematic diagram is shown, illustrating an embodiment of a lighting system according to the present invention. The lighting system comprises: a primary power supply 10; a light module 20; and a switching arrangement 80.

The primary power supply 10 provides power, such as from a mains supply, to the light module 20. Where the primary power supply is a mains supply, the voltage may vary depending upon the country and application of the lighting system. The primary power supply 10 provides a permanent live supply in that, barring power cuts, electricity is always available. To allow the lighting system to be switched on and off, a light switch 85 is provided in the switching arrangement 80. The switching arrangement 80 provides a switching signal 75 to the light module 20 which may be used to control whether a light source 60 of the light module 20 is on or off. The light module 20 receives power inductively from the primary power supply 10 and passes this to the light source 60 depending on the state of the switching signal 75.

The primary power supply 10 includes a primary coil 15 for inductive coupling to the light module 20. As such, the primary power supply 10 does not have any exposed electrical connections. The primary coil 15 has a toroidal winding. This primary power supply 10, via the outlet of coil 15, corresponds to a ceiling or wall fitting.

The light module 20 may correspond approximately in shape and in size to a light bulb. The light module has a housing that comprises at least one connecting portion. The at least one connecting portion is configured to fit into the associated light fitting and be supported by the light fitting. It may fasten to the coil outlet of the primary power supply 10 in standard fashion such as through a screw or bayonet light fitting. The lighting module 20 comprises a power receiving device 30; a back-up battery 40; a light source 60; and a signal receiver 70. The light module 20 receives power from the coil 15 of the primary power supply 10 through the power receiving device 30, and uses this to power light source 60. The back-up battery 40 provides an alternative power source when power from the primary power supply 10 is unavailable. The signal receiver 70 receives from the switching apparatus 80, the switching signal 75 which is used to control the light source. The signal receiver 70 is positioned in the connecting portion of the light housing, such that there is close coupling between it and the switching apparatus 80, but such that the switching signal 75 is received without exposed electrical connections between the light module 20 and switching arrangement 80.

The power receiving device 30 comprises a secondary coil 35. The secondary coil 35 is located in a connecting portion of the light housing and is positioned such that, when the light module 20 is fitted to the primary power supply 10, the secondary coil 35 is close to the primary coil 15 such that a voltage is induced across the secondary coil 35. The secondary coil 35 also has a toroidal winding, with a ring diameter such that the secondary coil 35 may fit within the primary coil 15 when the light module 20 is placed in the ceiling or wall fitting. In this embodiment, the power receiving device 30 comprises a power controller for converting the power received by the secondary coil 35 into the power output 37. A power controller 36 is also provided which couples the power input from the secondary coil 35 to the power output 37.

The back-up battery 40 of the light module 20 may be coupled to the power output 37 of the power receiving device 30. In this way, the back-up battery 40 may be charged by the power output 37. Optionally, a battery charge controller 45 is provided for controlling the power used for charging the battery 40.

In this embodiment, the light module 20 comprises a light controller 50 for controlling the light source 60 depending on the switching signal 75. The light controller 50 may be coupled to the power output 37 and to the back-up battery 40. In this way, the light controller may power the light source 60 using the power output 37 or using the output of the back-up battery 40.

Figure 2:
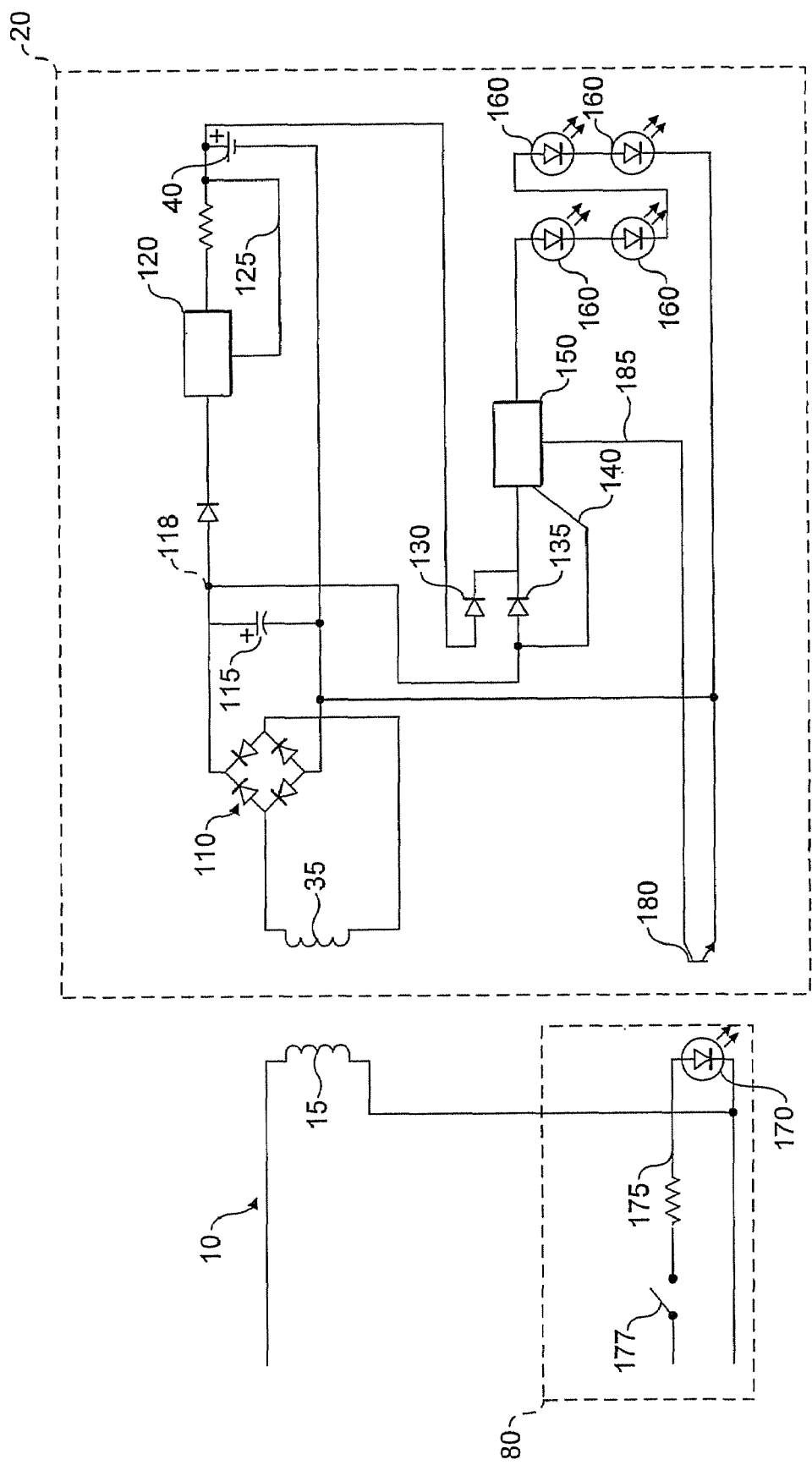
FIG. 2 shows a circuit diagram of a second embodiment of a lighting system according to the present invention.

Referring now to FIG. 2, a circuit diagram of a second embodiment of the present invention is shown that generally accords with the embodiment of FIG. 1. As before, the lighting system comprises a power supply 10 supplying electricity to a primary coil 15. The primary power supply 10 comprises a ceiling or wall fitting.

The switching arrangement 80 is powered by the mains supply 10 and shares a common ground with the primary coil 15. Part of the switching arrangement, in particular switch 177, may be fixed in a separate wall fitting to the coil outlet. The switch 177 is connected to LED 170 through a switched line 175. The switch 177 therefore controls when LED 170 is illuminated and generates light.

The lighting system also comprises a light module 20, including a secondary coil 35, arranged to receive ac power from the primary coil 15. The primary coil 15 is preferably implemented as part of a holding device such as a wall fitting or ceiling fitting, which is adapted to receive the light module 20, such that secondary coil 35 is positioned proximate to the primary coil 15. The light module 20 is preferably embodied as a sealed lamp using a light housing, such that water may not enter the lamp. The lamp is therefore waterproof. The secondary coil 35 is coupled to as an input to a rectifier circuit 110, the output of which is connected to a smoothing capacitor 115.

The smoothing capacitor's power output 118 is coupled to a battery charge controller 120. The battery charge controller 120 is coupled to a back-up battery 40 and also receives as an input a sensing signal 125, for controlling the charging current provided to the back-up battery 40.

The smoothing capacitor's power output 118 is coupled to a current controller 150, firstly via a diode 135 (hereinafter referred to as the capacitor diode 135) and secondly via a sensing line 140. The back-up battery power output is also coupled to the current controller 150, via a diode 130 (hereinafter referred to as the battery diode 130).

The current controller 150 regulates the power input to provide a power output which is provided to LEDs 160. The expected lifetime of the LEDs 160 is greater than that of the back-up battery. When provided with the power output from the current controller 150, the LEDs 160 emit light.

The light module also comprises a photodiode 180 that interfaces with the switching arrangement 80. The photodiode 180 generates a switching signal 185 based on the received light level from LED 170. The switching signal 185 is provided to the current controller 150.

The lighting system may be also used in environments with large quantities of water, for instance in a shower cubicle, or a swimming pool. The lamp unit is hermetically sealed to be waterproof and also to withstand the pressure requirements of the environment in which it will be used.

As the light sources, comprising LEDs, are cold-running, the temperature of the light unit is maintained at a low level. The light module 20 comprises an o-ring 95, positioned on the exterior of the housing of light module 20. The o-ring 95 is used to create a seal between the housing of light module 20 and the primary power supply 10, so as to seal the space between the light module and the ceiling or wall fitting, and to keep this space watertight. This improves the induction between the primary coil 15 and the secondary coil 35. Conventional light bulbs are unable to utilise an o-ring in this sealing application, as the o-ring is unable to withstand the high temperatures that other light sources may cause.

The battery is housed within the sealed lamp. Then, battery management is an important consideration. Over time, the back-up battery may emit gasses. These gasses should be removed from the light. A valve 90 is provided to allow the emission of gasses from the light. Valve 90 is hydrophobic such that gasses from within the light are allowed to exit through the valve, but water from outside the sealed light is prevented from entering the light. In this way, the light is able to withstand the required environmental pressure and maintain its waterproofing.

Hence, the lighting system of FIG. 2 may operate in the following way. Under normal circumstances when the mains power supply is working and available, power is supplied to primary coil 15, which causes a voltage to be induced across secondary coil 35, thereby providing an induced power source. The induced power is provided to the rectifier circuit 110 and smoothing capacitor 115, which produces a dc power output 118. This dc power output 118 is provided to battery charge controller 120 thereby charging back-up battery 40.

The dc power output 118 is also provided to current controller 150, which senses that the dc power output is non-zero using sense line 140. The voltage at the dc power output 118 is greater than the voltage across back-up battery 40. Hence the capacitor diode 135 is forward biased such that current flows from the dc power output 118 through the capacitor diode 135 and into the current controller 150. At the same time, the battery diode 130 is thereby reverse biased and so no current is drawn from the back-up battery 40. Hence, the current controller arranges itself to provide an output using only the dc power output 118.

Hence, when the mains power supply is available, the light module 20 may be advantageously controlled in the following way. When switch 177 is on, LED 170 is enabled and photodiode 180 generates a switching signal 185 that is a positive current, which is coupled to the current controller 150. The current controller, in response to the positive switching signal provides a power output using the dc power output 118 to the LEDs 160, causing them to light.

When switch 177 is turned off, LED 170 is also turned off and so photodiode 180 causes a switching signal 185 that has zero current, which is sensed by the current controller 150. The current controller 150, in response to the zero switching signal does not provide a power output to the LEDs 160, causing them to not light.

However, under a different circumstance, when the mains power supply 10 fails, no voltage is induced across secondary coil 35 and the smoothing capacitor's power output 118 provides zero power. The voltage across the back-up battery 40 is greater than the voltage at the dc power output 118. Hence the capacitor diode 135 is reverse biased and the battery diode 130 is forward biased such that current flows from the back-up battery 40 through the battery diode 130 and the back-up battery 40 provides power to the current controller 150. The current controller 150 also senses that the smoothing capacitor's power output is zero using sense line 140. Hence, the current controller arranges itself to provide an output using the output from back-up battery 40.

By removing the light module 20 from the primary power supply 10, in other words taking the light module 20 out of the wall or ceiling fitting, the light module 20 may be powered using back-up battery 40 and may advantageously be used as a portable torch. Nevertheless, in such a case the signal receiver 70 will not receive the switching signal 75 and the light will remain on.

In this embodiment, the current controller 150 does not respond to the switching signal 75 when it senses that smoothing capacitor's power output 118 is zero.

Figure 3:
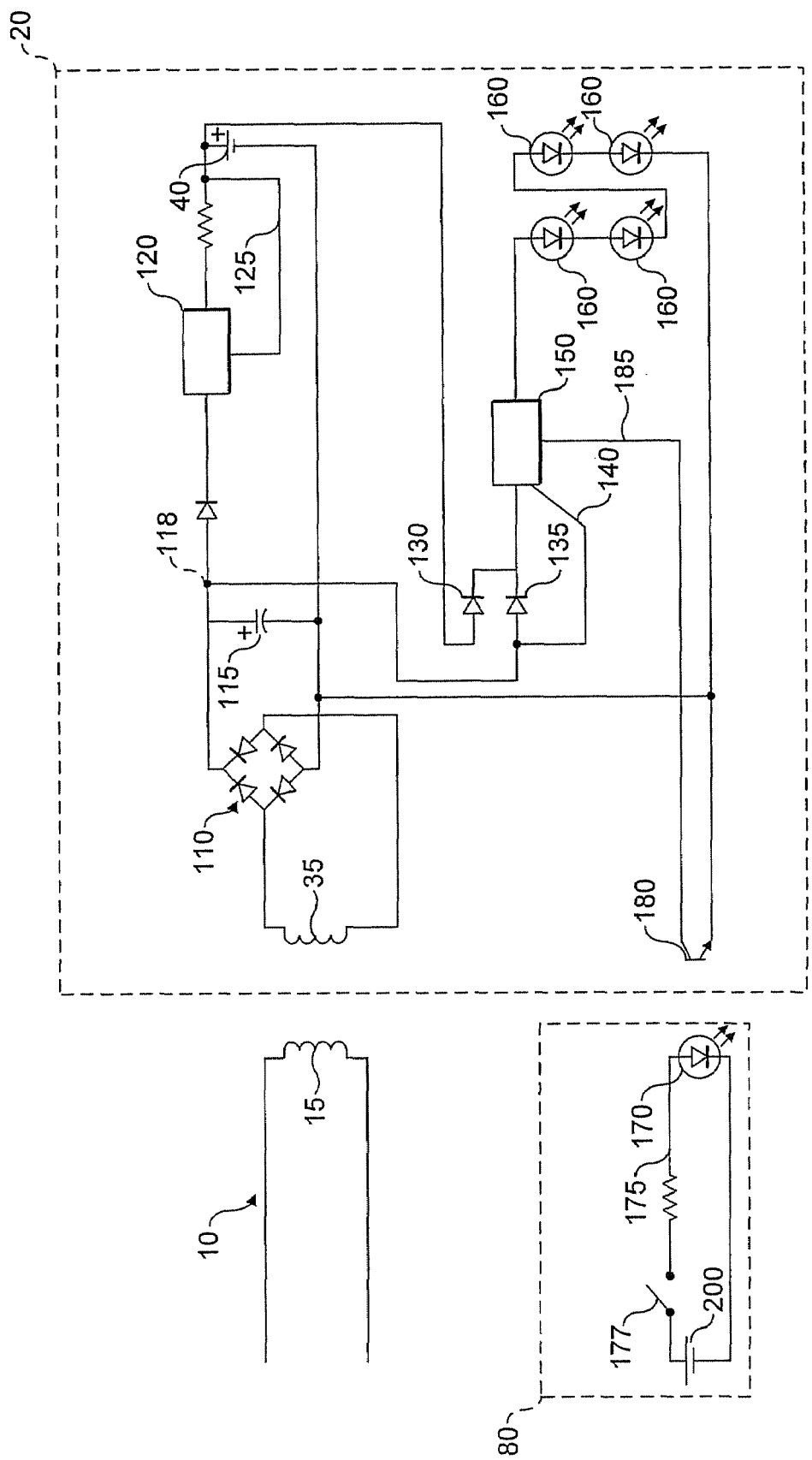
FIG. 3 shows a circuit diagram of a third embodiment of a lighting system according to the present invention.

Referring now to FIG. 3, a circuit diagram of a third embodiment of a lighting system according to the present invention is shown. The lighting system comprises: a primary power supply 10 coupled to a primary coil 15; a light module 20; and a switching arrangement 80.

The light module 20 is the same as that shown in FIG. 2. However, in FIG. 3, the switching arrangement 80 differs and comprises a battery 200; a switch 177; and an LED 170. The LED 170 is controlled by the switch 177 that is coupled to battery 200. Advantageously, the switch 177 controls when power is provided to LED 170. This embodiment allows for a more portable switching arrangement which need not be fixed to a wall although it may be fixed in place if desired.

Figure 4:
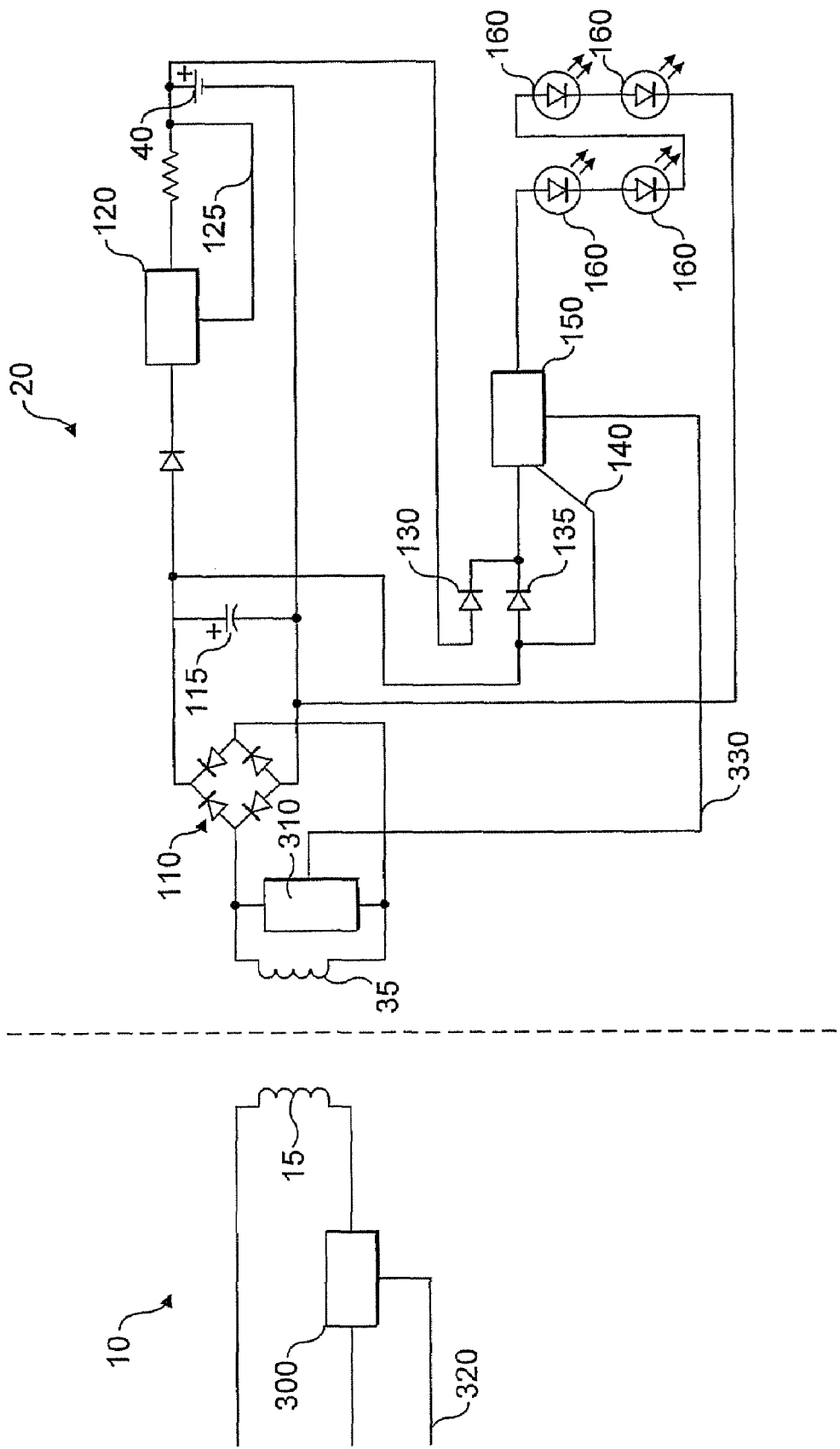
FIG. 4 shows a circuit diagram of a fourth embodiment of a lighting system according to the present invention.

Referring now to FIG. 4, there is shown a fourth embodiment of the present invention. Where the same components are used as described with reference to previous embodiments, identical reference numerals are employed.

A primary power supply 10 comprises a permanent supply, a lamp holder including a primary coil 15, and power signal modulation electronics 300 on the neutral line.

The lamp holder includes protection against water ingress, for example, using an o-ring as described above, such that it is water-proof. The permanent supply may be provided using a cable that is moulded into the lamp holder so as to facilitate ingress protection. Moreover, the primary power supply unit may be fully encapsulated or moulded to ensure adequate water-proofing.

The power signal modulation electronics 300 is powered by the permanent supply and could alternatively be located in the live line without otherwise changing this embodiment. The permanent voltage supply could be either 110V AC or 240V AC. Under normal operation, a primary coil voltage is continuously supplied to the primary coil 15.

The power signal modulation block 300 selects a reference voltage, which is the minimum amplitude for the primary coil voltage. In the embodiment shown, the reference voltage is 48V AC on the side of the primary coil 15. Although the primary coil voltage may be increased above the reference voltage, the power signal modulation block 300 never reduces the primary coil voltage below the reference voltage irrespective of the switching signal. The only time the reference voltage is not present is when the permanent voltage supply fails, for example when there is a power cut.

The secondary coil 35 receives the inductively coupled voltage and passes the received voltage to a signal demodulation block 310. Due to the windings ratio between the primary coil 15 and the secondary coil 35, the voltage across the secondary coil 35 may be different from that across the primary coil 15. For example, when the primary coil voltage is 48V AC, the secondary coil voltage may be 12V AC. Consequently, the signal demodulation block 310 recognises a reference voltage that may be different from the reference voltage on the side of the primary coil 15.

As long as the secondary coil voltage is maintained to be at least the reference voltage, the battery charge controller 120 will continue to operate.

A switching signal 320 from a switch (not shown) is provided to the power signal modulation electronics 300. In this embodiment, the switching signal is provided using a wired switch, in other words, a light switch. This is directly linked to the power signal modulation electronics 300. A preferred voltage is provided across the switch, which is suitable to match the power signal modulation electronics 300. The voltage across the switch may be of a different value to that of the permanent supply. The advantage of this is that the switch may be operated at a safety extra low voltage enabling the positioning of the switch in higher moisture areas due to the electrical safety of said switch.

When the switching signal 320 indicates that the light should be turned on, the power signal modulation electronics 300 facilitates an increase in the primary coil voltage. For example, the primary coil voltage can be increased from the reference voltage of 48V AC to 72V AC. This, in turn, will directly increase the secondary coil voltage, across the inductive coupling. For example, the secondary coil voltage can be increased from the reference voltage of 12V AC to 18V AC. This is effectively a form of digital amplitude modulation (amplitude shift keying) of the inductively coupled power signal.

The signal demodulation electronics 310 detects this increase in voltage and sends instruction via light control signal 330 to the current controller 150 so as to facilitate the switching on of the LEDs 160 in the array.

When the switching signal 320 indicates that the light is to be turned off, the power signal modulation electronics 300 adjusts the primary coil voltage, restoring it to the reference voltage (48V AC). This in turn affects the voltage out on the secondary side of the inductive coupling (18V AC returns to reference voltage 12V AC) The signal demodulation electronics 310 detects this change and changes the light control signal 330, such that the current controller 150 switches off of the LEDs 160 of the array.

Figure 5:
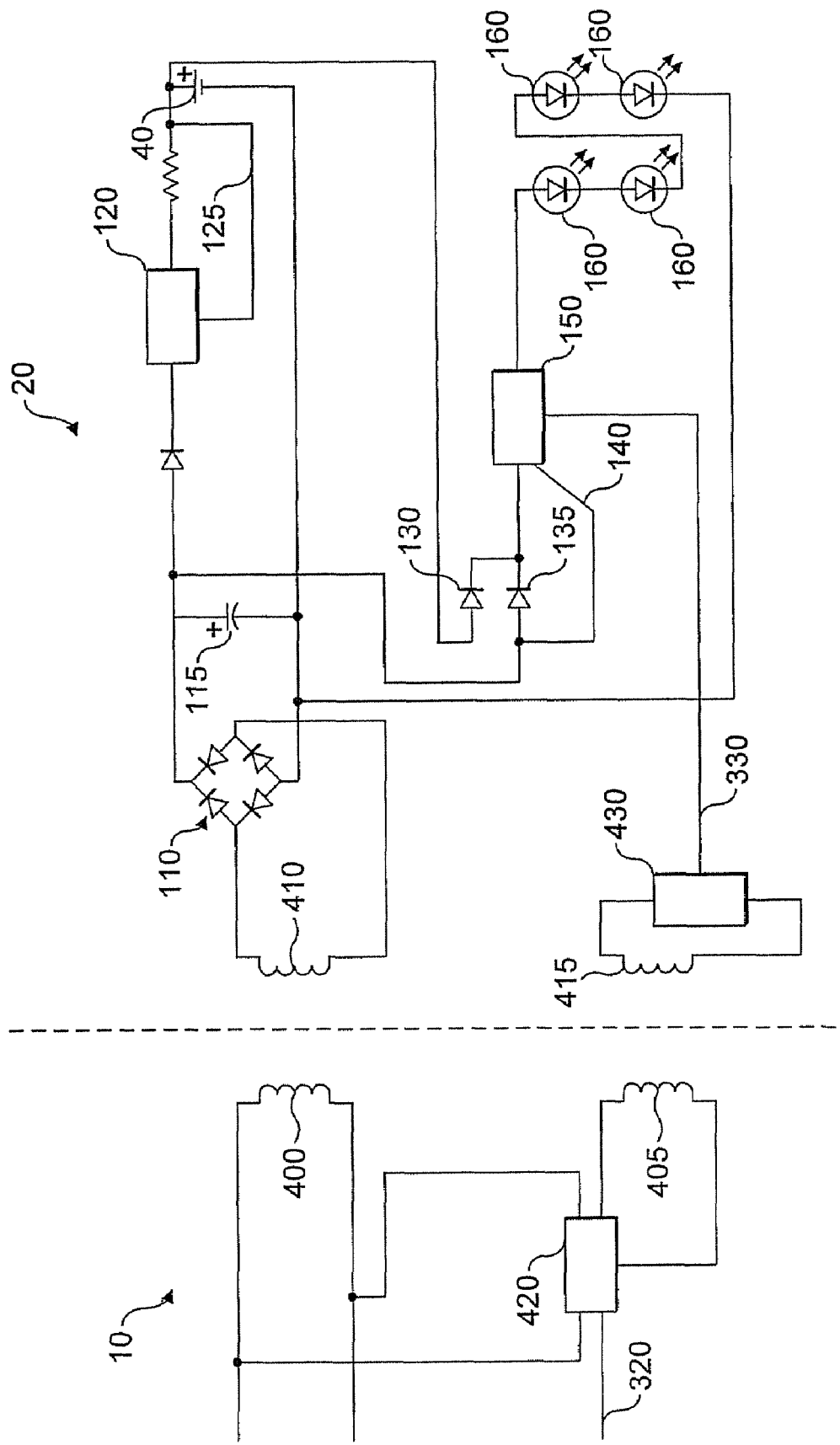
FIG. 5 shows a circuit diagram of a fifth embodiment of a lighting system according to the present invention.

Referring now to FIG. 5, there is shown a circuit diagram of a fifth embodiment of the present invention. This embodiment is similar to that shown in FIG. 4, and where the same components are indicated, the same reference numerals are used.

In this embodiment, the permanent supply is provided directly to a first primary coil 400. The permanent supply is also supplied to the power signal modulation electronics 300. A second primary coil 405 is also provided. The amplitude of the voltage across the first primary coil 400 is set to be at least a reference voltage, such that a corresponding reference voltage is received at a first secondary coil 410.

When the switching signal 320 is enabled, to indicate that the switch is on, the power signal modulation electronics 420 transmits a preferred frequency over the second primary coil 405, which is received by a second secondary coil 415. The signal demodulation electronics 430 detects the frequency transmitted by the second primary coil 405, and controls the current controller electronics 150 accordingly, using light control signal 330. This enables the LEDs 160 in the array to be switched on.

When the switching signal 320 is disabled, to indicate that the switch is off, the signal modulation electronics 300 ceases to transmit the preferred frequency over second primary coil 405 and second secondary coil 415. The signal demodulation electronics 310 detects that the preferred frequency is not present and controls the current controller 150 to turn the LEDs 160 in the array off.

Although preferred embodiments have been described above, the skilled person will realise that variations may be made without departing from the scope of the present invention.

Optionally, the sealed light may be partially or fully evacuated to prevent condensation within the sealed light due to the materials or due to trapped vapour, when a temperature differential exists between the interior and exterior of the light.

Although an optical transmitter and receiver have been used to convey and receive the switching signal respectively in the first, second and third embodiments, the transmitter and receiver may instead use other arrangements such as electromagnetic signals for instance a radio signal, an infrared signal, an electrical signal which may be capacitively coupled, or a magnetic signal, for instance using a magnetic relay, where the transmitter would comprise an electromagnet. The fourth and fifth embodiments also show a transmitter and receiver which use inductive coupling for communication therebetween. Signalling should be effected at a distance such that no live exposed electrical connections are used and any safety requirements due to humidity are met.

Although the primary coil and secondary coil of the preferred embodiments have toroidal windings, the skilled person will understand that other shapes may be alternatively used and that the secondary coil need not fit within the primary coil. The skilled person will also appreciate that the power controller 36 may include other power controlling circuits, for instance, a regulator for regulating the power output 37.

The skilled person will understand that, in some embodiments, the current controller 150 may be responsive to the switching signal 75 even when the current controller 150 senses that no power output is received from the smoothing capacitor 115 because of a total mains failure, i.e. in the event of a mains failure the light will be powered by the back-up battery 40 but may still be switched on and off. Alternatively, a second switching signal may be provided that may be used to switch the light on and off in the event of a mains failure.

Optionally, the skilled person will appreciate that the o-ring 95 may be attached to the exterior of the insulating material of the primary power supply 10, rather than to the exterior of the housing of the light module 20. The o-ring should thereby seal the space between the insulator housing for the primary power supply 10 and the light housing. Although an o-ring is described, the skilled person will understand that other shapes of ring are possible, such that the desired seal may be provided in an alternative way. The skilled person will also appreciate that the location of the o-ring may be varied to provide the seal.

In an alternative embodiment to that shown in FIG. 5, the first primary coil 400 and second primary coil 405 may have varying connectivity. The power signal modulation electronics 300 can facilitate a selection of position along the primary coils thereby adjusting the primary voltage output and in doing so alter the secondary voltage side, for example in the same electronic design as a variable autotransformer.

In a further alternative embodiment to that shown in FIG. 5, only a single primary and secondary coil might be used. The switching signal may instead be provided using a frequency modulated signal superimposed on top of the AC power signal. Then a low pass filter may be used to recover the power signal and a high pass filter may be used to recover the switching signal.

In the above embodiments, the switching signal 75 has been shown as a digital signal, being either positive or negative. However, the skilled person will understand that an analogue signal may alternatively be used, and that other digital signals may be used, for instance a pulse coded modulation signal, a line-coded binary signal or other known signalling means.

The switch may be mounted on a wall or may be a remote control, particularly if connected to an optical or radio transmitter for sending the switching signal to the light module 20. Nevertheless, if the switch is a remote control, the transmitter for communicating the switching signal to the light is housed within the light fitting. The switch 177 has been described as a simple on/off device, although the skilled person will recognise that a dimmer switch may also be used with an appropriately adapted switching signal. The switch may alternatively be embodied in a computer controlled data stream.

The light source 60 may comprise a device other than an LED, for instance, other semiconductor lighting devices, light bulbs of all types or fluorescent tubes.

The light module 20 is described above as a sealed lamp and the primary coil 15 is described as being embodied in a holder. Alternatively, the primary coil 15 and light module 20 may be fixed in place.

Although the embodiments of a light described herein only use the back-up battery 40 when the inductive power source is not available, the skilled person will understand that power can be drawn from the back-up battery 40 even when the inductive power source is available. In such a case, the inductive power source can be used to charge the battery, as the battery is being used.

The invention claimed is:

1. A lighting apparatus comprising:
a light fitting adapted to support an associated light and having a space adapted to receive the associated light; and
an input arranged to receive a control signal, the control signal having at least two switching states corresponding to the associated light being turned on and off;
wherein the light fitting further comprises:
an electrical output comprising a coil arranged to provide a power signal inductively to the associated light;
a transmitter arranged to send a switch signal wirelessly to the associated light, the switch signal being established in accordance with the state of the control signal thereby effecting turning on and off of the associated light;

the power signal being non-zero irrespective of the switch signal, and the light fitting being arranged to present the coil and the transmitter for cooperating with a respective coil and respective receiver in the associated light.

2. The lighting apparatus of claim 1, wherein the light fitting is arranged to position the coil and the transmitter adjacent to the space adapted to receive the associated light.

3. The lighting apparatus of claim 1, wherein the lighting apparatus further comprises:
an electrical input arranged to receive electrical power from a power source; and
wherein the electrical output is arranged permanently to use the electrical power received to provide the power signal.

4. The lighting apparatus of claim 3, wherein the lighting apparatus further comprises:
a battery, arranged to provide electrical power to the transmitter.

5. The lighting apparatus of claim 3, wherein the transmitter is arranged to receive electrical power from the power source.

6. The lighting apparatus of claim 1, wherein the light fitting comprises:
insulating material separating the coil from the space.

7. The lighting apparatus of claim 6, wherein all of the light fitting's exterior surface is electrically insulated from the coil and the transmitter.

8. The light apparatus of claim 6, wherein the transmitter comprises a source of electromagnetic radiation and wherein the light fitting comprises:
insulating material separating the coil and the transmitter from the space, and wherein at least a portion of the insulating material adjacent the transmitter is substantially transparent to the electromagnetic radiation.

9. The light apparatus of claim 8, wherein the transmitter comprises a source of infra-red radiation or a light source.

10. The light apparatus of claim 9, wherein the transmitter is an LED.

11. The light apparatus of claim 1, wherein the transmitter comprises a coil.

12. The light apparatus of claim 11, wherein the transmitter comprises the coil of the electrical output, such that the coil simultaneously provides the power signal and the switch signal to the associated light.

13. The light apparatus of claim 12, wherein the light fitting further comprises a modulator, arranged to adjust the amplitude of the power signal based upon the control signal.

14. The light apparatus of claim 11, wherein the light fitting further comprises a modulator, arranged to adjust the frequency of the switch signal based upon the control signal.

15. The light apparatus of claim 1, wherein the control signal has at least three switching states corresponding to the associated light being turned fully on, partially on, and off, and the transmitter is arranged to send the switch signal in accordance with the state of the switch thereby effecting turning the light source fully on, partially on and off.

16. A light comprising:
a light source;
a coil arranged to receive an electrical power signal inductively and to provide electrical power to the light source;
a back-up battery arranged to provide electrical power to the light source when the coil does not receive electrical power;
a receiver operable to receive wirelessly a further, switch signal;
a controller operable to control flow of power to the light source from the coil and the back-up battery responsive to the received switch signal; and
a sealed light housing to house the light, the light housing being arranged to present the coil and the receiver for cooperating with a respective coil and respective transmitter in an associated light fitting.

17. A light according to claim 16, wherein the sealed light housing comprises a connecting portion, the connecting portion housing the coil and receiver and comprising an insulating material.

18. A light according to claim 17, wherein all of the light housing's exterior surface is electrically insulated from the coil and the receiver.

19. A light according to claim 16, wherein the receiver is arranged to respond to received electromagnetic radiation.

20. A light according to claim 16, wherein the sealed light housing comprises a connecting portion, the connecting portion housing the coil and receiver and comprising an insulating material, wherein the receiver is arranged to respond to received electromagnetic radiation, and wherein at least a portion of the insulating material adjacent the receiver is substantially transparent to electromagnetic radiation.

21. A light according to claim 20, wherein the receiver comprises a photodiode.

22. The light of claim 16, wherein the receiver comprises a coil.

23. The light of claim 22, wherein the receiver comprises the coil arranged to receive the electrical power signal, such that the coil is further arranged to receive the switch signal.

24. The light of claim 23, wherein the receiver comprises a demodulator, arranged to determine the switch signal based on the amplitude of the power signal.

25. The light of claim 22, wherein the receiver comprises a frequency demodulator.

26. A light according to claim 16, wherein the switch signal has two states and the controller is arranged to provide no power to the light source in response to the switch signal having a first state and to provide power to the light source in response to the switch signal having a second state.

27. A light according to claim 26, wherein the switch signal has three states and the controller is arranged to provide a first power level to the light source in response to the received switch signal having a second state and to provide a second power level to the light source in response to the received switch signal having a third state.

28. A light according to claim 16, wherein the light source comprises an LED.

29. A light according to claim 16, further comprising:
a battery charger, arranged to provide power from the coil to the back-up battery, thereby to charge the back-up battery.

30. A light according to claim 16, wherein the back-up battery is further arranged to provide electrical power to the light source when the coil receives electrical power.

31. A light according to claim 16, further comprising:
a routing device, arranged to power the light source from the coil when the coil receives electrical power and to power the light source from the back-up battery when the coil does not receive electrical power.

32. A light according to claim 31, wherein the switching device comprises:
a first diode, biased to allow power to flow from the coil to the light source when the coil receives electrical power; and a second diode, biased to allow power to flow from the back-up battery to the light source when the coil does not receive electrical power.

33. A light according to claim 16, wherein the light housing forms a sealed, watertight unit.

34. A light according to claim 33, further comprising:
a ring, arranged on the light housing, such that the light housing is sealable to an insulating material.

35. A light according to claim 33, further comprising:
a valve, arranged to allow gas to exit the light housing and to prevent water from entering the light housing.

36. A lighting system comprising:
a light comprising a sealed light housing and a light source;
a light fitting with a first connector piece arranged to support the light and provide power thereto;
a light switch operable to turn the light on and off;
the light fitting comprising an input connected to a power source and arranged to provide power permanently to an output comprising a primary coil, and a transmitter coupled to the switch and operable to transmit a switch signal dependent upon the switch position;
the light further comprising a second connector piece having a secondary coil and a receiver, the receiver being operable to receive the switch signal; a light source connectable to the secondary coil to be powered therefrom; a back-up battery connectable to the light source to provide power thereto in the event of a failure in the power supply from the secondary coil; and a controller operable to control power delivery to the light source in response to the switch signal received by the receiver thereby to turn the light on and off;
wherein the light fitting and the light are arranged to present the primary coil and the secondary coil for inductive coupling therebetween and to present the transmitter and the receiver for wireless communication therebetween.

37. A lighting apparatus comprising:
a light fitting adapted to support an associated light and having a space adapted to receive the associated light; and
an input arranged to receive a control signal, the control signal having: a first switching state corresponding to the associated light being turned on; and a second switching state corresponding to the associated light being turned off;
wherein the light fitting further comprises:
an electrical output comprising a coil arranged to provide a power signal inductively to the associated light, the light fitting being arranged to present the coil for cooperating with a respective coil and respective receiver in the associated light; and
wherein the power signal comprises one of: a first non-zero power signal; and a second non-zero power signal, the electrical output being arranged to provide the first power signal when the control signal comprises the first switching state, and the second power signal when the control signal comprises the second switching state.

* * * * *